(12) United States Patent
Dennis et al.

(10) Patent No.: US 7,969,216 B2
(45) Date of Patent: Jun. 28, 2011

(54) SYSTEM AND METHOD FOR IMPROVED TIMING SYNCHRONIZATION

(75) Inventors: Charles A. Dennis, Warrenton, VA (US); Dale A. Rickard, Manassass, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 85 days.

(21) Appl. No.: 12/614,247

(22) Filed: Nov. 6, 2009

(65) Prior Publication Data
US 2011/0109360 A1    May 12, 2011

(51) Int. Cl.
*H03K 7/00*    (2006.01)
(52) U.S. Cl. .................................... 327/161; 327/261
(58) Field of Classification Search .................. None
See application file for complete search history.

(56) References Cited

U.S. PATENT DOCUMENTS

| | | | |
|---|---|---|---|
| 4,920,410 A * | 4/1990 | Tomii et al. | 348/796 |
| 6,288,699 B1 * | 9/2001 | Kubota et al. | 345/99 |
| 6,483,825 B2 * | 11/2002 | Seta | 370/335 |
| 7,209,849 B1 * | 4/2007 | Watanabe et al. | 702/108 |
| 7,236,035 B2 * | 6/2007 | Shiratake et al. | 327/291 |
| 7,423,463 B2 * | 9/2008 | Drexler et al. | 327/158 |
| 7,432,752 B1 * | 10/2008 | Lee et al. | 327/175 |

\* cited by examiner

*Primary Examiner* — Cassandra Cox
(74) *Attorney, Agent, or Firm* — Graybeal Jackson, LLP; Bryan A. Santarelli; Daniel J. Long

(57) ABSTRACT

Embodiments of a method and system for both open-loop and closed-loop timing synchronization are provided in which a master clock signal, and a plurality of signals that define greater periods of time, are distributed to a plurality of host devices. A frame-sync signal is used to define a "frame" consisting of a predetermined number of clock periods, and a reset signal is used to define a larger period consisting of a predetermined number of frames. Due to a variety of system parameters, the innate delay time associated with each respective timing distribution path may differ. The system is operable to adjust the timing signals propagated to the plurality of host devices along each respective timing distribution path to compensate for these differences so that each host device remains synchronized with all other host devices.

23 Claims, 7 Drawing Sheets

SYSTEM AND METHOD FOR IMPROVED TIMING SYNCHRONIZATION

GOVERNMENT CONTRACT

The present application was made with United States Government support under Contract (Grant) No. 08-C-0041 awarded by the United States Government. The United States Government may have certain rights in this application.

BACKGROUND

Many electronic systems benefit from or require accurate timing synchronization between various components, which may be called "hosts" or "host devices." Such systems may need to maintain this accurate timing synchronization over long periods of time. Examples of such systems include those using a phased antenna array, such as a radio-astronomy system or a phase-array radar system, in which a plurality of signals from a plurality of antennas or antenna elements must be accurately synchronized for proper aggregation and analysis.

Such a system may generate a master system clock that is distributed to each of the plurality of host devices to synchronize the devices with each other and with the system as a whole.

Host devices may be located remotely from the location of the master-system-clock generator, and the distance between a particular host device and the clock generator may vary among the host devices.

Disparate distances between the master-system-clock generator and the host devices may complicate timing synchronization among the host devices and between the host devices and other components of the system.

Furthermore, although the distance between a particular host device and the clock generator may be known and compensated for when a system is installed, events that occur in the system may introduce errors into the system synchronization. Examples of events that may introduce errors into the system synchronization include aging of system components, exposure of system components to radiation, changes in the temperatures of the system components, and electromagnetic interference (e.g., noise).

Although expected levels of such synchronization-degrading events may be determined and compensated for at the time of system installation, such synchronization compensation may become insufficient as the level of an event changes over time, or may be insufficient if an event occurs at a level that is outside of an expected range.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Embodiments of closed-loop and open-loop techniques for synchronizing the components of a system include distributing to a plurality of host devices a master clock signal, a frame-sync signal, and a master-frame-reset signal. The frame-sync signal and master-frame-reset signal have frequencies that are fractions of the frequency of the master clock signal. The frame-sync signal has a period (a "frame") that spans a predetermined number of master-clock periods, and a master-frame-reset signal has a period (a "master frame") that spans a predetermined number of frames. Due to a variety of system parameters such as the respective connection lengths between the master-clock-signal generator and each host device, system fabrication processes, and the nature of the respective host devices themselves, the signal propagation delay time of each timing distribution path may differ. Therefore, an embodiment of the system is operable to delay and adjust the phase of each of the timing signals distributed to the host devices along these timing distribution paths to compensate for these propagation-delay differences so that each host device remains synchronized with the other host devices and with the system as a whole. A closed-loop technique may provide greater synchronization accuracy than an open-loop technique, but an open-loop technique may be suitable in a system that can tolerate lower synchronization accuracy or in which a closed-loop technique has failed or otherwise cannot be implemented.

DETAILED DESCRIPTION

Figure 1:
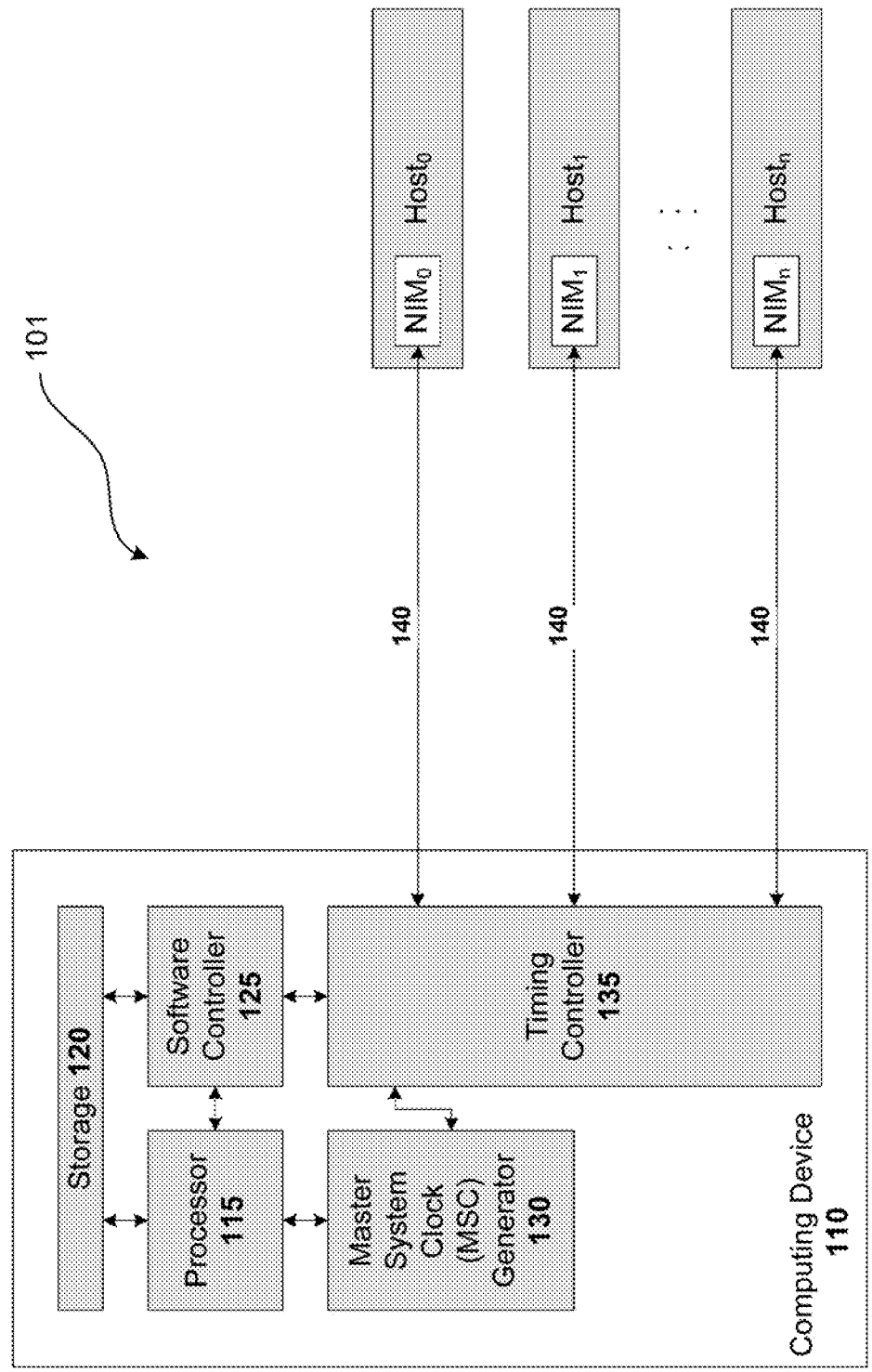
FIG. 1 is a diagram of an embodiment of a system that synchronizes components of the system.

FIG. 1 is a diagram of an embodiment of a synchronized system 101, which includes a computing device 110 for synchronizing a plurality of host devices $HOST_0$-$HOST_n$ with each other and with other components of the system. The computing device 110 includes a processor 115 coupled to a storage module 120, a software controller 125, a master system clock (MSC) generator 130, and a timing controller 135. The host devices $HOST_0$-$HOST_n$ include respective network interface modules $NIM_0$, $NIM_1$, ..., $NIM_n$, which are respectively coupled to the timing controller 135 via respective paths $140_0$-$140_n$. Examples of host devices $Host_0$, $Host_1$, ..., $Host_n$ may include imagers, radio-frequency transmitters and/or receivers, antennas or antenna elements, elements of a sonar array, or any other component that is to be synchronized with one or more of the other host devices or with one or more other components of the synchronized system 101.

The processor 115, as well as the various illustrative logical blocks, modules, units, and circuits described in connection with the embodiments disclosed herein, may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 115 may be a microprocessor, or any conventional processor, controller, microcontroller, or state machine. The processor 115 may also be implemented as a combination of computing devices, e.g., a combination of a DSP and a microprocessor, a plurality of microprocessors, one or more microprocessors in conjunction with a DSP core, or any other such configuration.

The storage module 120 includes calibration information (such as pre-installation timing measurements between various system components) and telemetry information (such as physical measurements recorded upon installation of the system or collected during system operation) regarding the components and connections utilized within the synchronized system 101. To obtain telemetry information, measurements of parameters such as age, voltage or physical characteristics are taken from one or more system elements, which may include the host devices and host interfaces. These may be used in conjunction with predictive models of expected system timing changes due to these parameters evolving over time in order to compute expected timing adjustments. Such information may include, but is not limited to: the lengths of distribution paths such as the paths $140_0$-$140_n$; delay models for elements of the system; present environmental conditions such as temperature, variations of different source voltages over time, and any detected radiation; and system variations due to those environmental conditions. For example, if synchronized system 101 is coupled to external components that receive a +5V voltage from two different voltage sources, but over time one of those voltage sources experiences degradation such that it provides only +4.87V, it could affect signal propagation delays within those components. If not compensated for, such degradation over time may affect operation of the synchronized system 101 as well.

The storage module 120 may include a computer memory, which may be a semiconductor memory such as DRAM, SRAM, FLASH or EPROM, and may also include a hard disk, floppy disk, CD ROM, DVD or any other tangible computer-readable storage medium, including associated error correction circuitry. Moreover, the storage module 120 may include any combination of the above. In one embodiment, the storage module 120 is implemented using a conventional triple-modular-redundancy (TMR) implementation to provide greater resistance to environmental effects, device failure, single-event upset, and other hazards.

The master system clock (MSC) generator 130 may include any signal generator operable to provide a clock signal CLK with a constant frequency. In an embodiment, the MSC generator 130 provides a square wave clock signal, but any recoverable clock signal waveform may be used. In addition, the MSC generator 130 provides a frame-sync signal FS and a master frame reset signal MFR at regular intervals. The relationships between clock signal CLK, frame-sync signal FS, and master frame reset signal MFR are described below with respect to FIG. 2.

The respective paths $140_0$-$140_n$ may include any transmission propagation medium, such as RF cable, fiber-optic cable, wireless, or a combination thereof. In an embodiment, the paths 140 are bidirectional. For example, one or more of the paths 140 may include separate forward and return paths for the respective host devices $Host_0$, $Host_1$, . . . , $Host_n$. Furthermore, the signals propagating along one or more of the paths 140 may be time- or frequency-multiplexed between the timing controller 135 and a plurality of host devices HOST such that one path 140 may be coupled to multiple host devices.

In the embodiment depicted by FIG. 1, a single timing controller 135 is used for all of network interface modules $NIM_0$-$NIM_n$ and their corresponding host devices $Host_0$-$Host_n$. The timing controller 135 may operate in either an open-loop or closed-loop configuration with each network interface module NIM. In an embodiment, each respective path 140 may be a separate physical connection path. In another embodiment, all of the respective paths 140 may be a time-multiplexed connection requiring a single physical path. In another embodiment, each network interface module NIM may be coupled to a separate timing controller 135.

The synchronized system 101 may be configured to operate in either open-loop or closed-loop modes. In an embodiment configured for use in an open-loop mode, the length of each respective path 140 between the timing controller 135 and a corresponding network interface module $NIM_0$, $NIM_1$, . . . , $NIM_n$ is known at the time of system configuration to accurately provide relevant telemetry information. In an embodiment of the synchronized system 101 configured for use in a closed-loop mode, each path 140 may be of any length, but if the path comprises separate forward and return paths, then the lengths of the forward and return paths may be substantially identical. In this way, timing signals for the forward path may be advanced or delay based on an assumption that the delay variation in the forward path approximates half of the total measured delay variation. In another embodiment, the return path may be of different length or over different media, provided that the timing characteristics of the return path are known or measured to the degree of accuracy required by the application. These timing characteristics are provided to the computing device 110. In an embodiment in which the synchronized system 101 operates in an open-loop configuration, adjustments to the timing signals for each respective path 140 between the timing controller 135 and a respective host device HOST are based upon the calibration and telemetry information stored within storage module 120. In an embodiment in which the synchronized system 101 operates in a closed-loop configuration, adjustments to the timing signals for each respective path 140 between the timing controller and a respective host device HOST are based upon both the calibration and telemetry information stored within storage module 120, and the dynamic delay measurements discussed below with respect to FIGS. 2-5.

The software controller 125 provides timing coordination for all of the network interface modules $NIM_0$, $NIM_1$, . . . , $NIM_n$ and the corresponding host devices $Host_0$, $Host_1$, . . . , $Host_n$ using the calibration and telemetry information stored in the storage memory 120, and using the dynamic delay measurements relevant to the corresponding signal path 140 provided by timing controller 135 if the system 101 is operating in a closed-loop configuration. The software controller 125 may comprise a plurality of components or modules implemented in hardware, in firmware, and/or in software that is embodied in hardware, firmware, or a tangible computer-readable medium. These components or modules may reside in RAM memory, flash memory, ROM memory, EPROM memory, EEPROM memory, registers, hard disk, a removable disk, a CD-ROM, or any other form of storage medium known in the art including associated error correction circuitry, and may comprise various sub-routines, procedures, definitional statements, and macros. The components or modules may be written in any scripting or programming language such as C, C++, BASIC, Pascal, Java, JavaScript, Perl, Ruby, Python, and Fortran and executed by any appropriate operating system. The processes associated with these components or modules may be arbitrarily redistributed to other components or modules, combined together in a single component or module, or made available in a shareable dynamic link library.

The timing controller 135 provides the software controller 125 with the necessary timing measurements relevant to each of the network interface modules $NIM_0, NIM_1, \ldots, NIM_n$ and the corresponding host devices $Host_0, Host_1, \ldots, Host_n$. Furthermore, the timing controller 135 effectuates the instructions from software controller 125 to individually advance or delay the timing signals provided to each of the network interface modules $NIM_0, NIM_1, \ldots, NIM_n$ and the corresponding host devices $Host_0, Host_1, \ldots, Host_n$ in order to synchronize all of the modules and corresponding host devices in the synchronized system 101.

In operation, the timing controller 135 provides the software controller 125 with the timing measurements needed to determine the propagation delay affecting the timing signals sent to each individual network interface module NIM. Table 1 below provides sample values that may be measured in a system having a total of four such network interface modules $NIM_0$-$NIM_3$ (each of which corresponds to a separate host device).

TABLE 1

| NIM | Measured Delay (ns) |
| --- | --- |
| 0 | 33.00 |
| 1 | 1244.80 |
| 2 | 900.35 |
| 3 | 212.43 |

For whatever reason (often a combination of various environmental effects and the physical length of the relevant propagation path), in the embodiment relevant to Table 1, the total measured delay corresponding to network interface module $NIM_1$ is the greatest among the four modules. In order to synchronize the timing signals provided to each network interface module (and corresponding host device) within the synchronized system 101, each of the other three network interface modules $NIM_0$, $NIM_2$ and $NIM_3$ must be delayed by a different perspective duration. Table 2 below provides the respective delays to be provided to each of those three network interface modules by the timing controller 135.

TABLE 2

| NIM | Measured Delay (ns) | Programmed delay (ns) | Total delay (ns) |
| --- | --- | --- | --- |
| 0 | 33.00 | 1211.80 | 1244.80 |
| 1 | 1244.80 | 0.00 | 1244.80 |
| 2 | 900.35 | 344.45 | 1244.80 |
| 3 | 212.43 | 1032.37 | 1244.80 |

By delaying the timing signals respectively sent to each of the three network interface modules $NIM_0$, $NIM_2$ and $NIM_3$ by the amount of time specified by the "programmed delay" column, all four network interface modules (and their corresponding host devices) receive those timing signals at substantially the same time, resulting in synchronization. As will be discussed in further detail below, the software controller 125, responsive to the delay measurements provided by timing controller 135, provides the timing controller 135 with the number of frames, clock periods, and/or fractions of clock periods by which to advance or delay the timing signals sent to each respective network interface module NIM.

Figure 2:
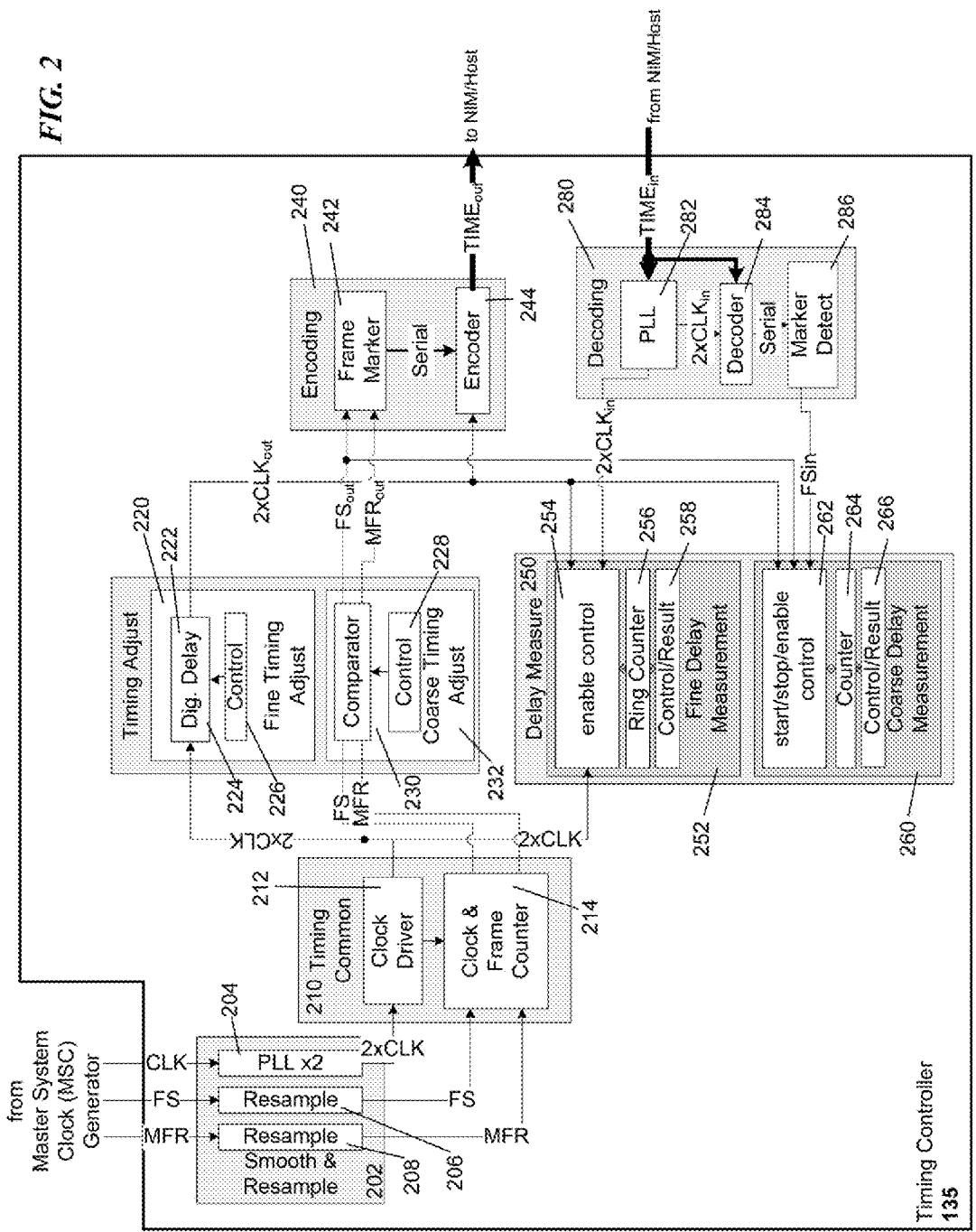
FIG. 2 is a diagram of an embodiment of the timing controller of FIG. 1 configured for closed-loop operation.

FIG. 2 is a diagram of an embodiment of the timing controller 135 of FIG. 1 operating in a closed-loop configuration with a single network interface module NIM and corresponding host device HOST.

The master system clock generator 130 (FIG. 1) provides the timing controller 135 with a clock signal CLK, a frame sync signal FS, and a master frame reset signal MFR. In an embodiment, the clock signal CLK is a square wave with a frequency of approximately 100 MHz. Of course, any desired frequency may be used, and any recoverable clock wave form may be employed.

The frame-sync signal FS is a pulse signal that occurs at regular intervals with respect to the master clock signal CLK; the master frame reset signal MFR is a pulse signal that occurs at regular intervals with respect to the frame sync signal FS. For example, the signal FS may occur once every $2^{15}$ periods of CLK, and the signal MFR may occur once every $2^{15}$ periods of the signal FS. In an embodiment, the width of each pulse of the frame-sync signal FS is substantially equal to one half the period of clock signal CLK. However, any pulse-width that is less than the period of frame-sync signal FS may be used.

The frame-sync signal FS is used as a reference point within the synchronized system 101, and provides the reference for logically advancing or delaying the timing signal to each Host. The frame-sync signal FS may be utilized for a variety of purposes. For example, in an embodiment within a system with a time-multiplexed communication backbone, each of the plurality of host devices $Host_0, Host_1, \ldots, Host_n$ may be able to send data via the shared communication backbone only in a time period delineated by a particular frame, such as the first one hundred clock periods following a frame-sync signal FS. In another embodiment, a particular host HOST may need to issue a request for system bandwidth within a certain time period following a frame-sync signal FS.

The master frame reset signal MFR is used to reset all synchronization counts within the synchronized system 101, and, therefore, the period of the signal MFR represents the longest time period for which the synchronized system 101 tracks signals for synchronization purposes. In the example above, with a clock period of 100 MHz, a signal FS occurring every $2^{15}$ periods of CLK, and a signal MFR occurring once every $2^{15}$ periods of FS, the period of the signal MFR is approximately 10.74 seconds. But the signals FS and MFR may have any suitable relationship to each other and to CLK. For example, the signal FS may occur once every $2^{10}$ periods of CLK, and the signal MFR may occur once every $2^{12}$ periods of FS.

The environmental factors expected to alter the delay characteristics for any given signal path 140—temperature, age, radiation, voltage, and other environmental factors—may be expected to affect the given signal path at a rate much slower than every 328 microseconds or so (the period of the frame-sync signal FS). That is, environmental effects are likely not going to be able to affect the system as quickly as the synchronized system 101 is able to compensate for those effects. In this way, the synchronized system 101 may adequately compensate for the changes to system parameters caused by environmental factors.

Additional information regarding the relationship between clock signal CLK, frame-sync signal FS, and the master frame reset signal MFR is provided below with respect to FIG. 4.

Still referring to FIG. 2, the clock signal CLK, frame sync signal FS, and master frame reset signal MFR are provided to a smoothing and resampling block 202.

In this embodiment, the clock signal CLK is smoothed by a phase-locked loop (PLL) 204 having a relatively long time constant and resampled at twice its incoming frequency. For example, if clock signal CLK has a frequency of 100 MHz, the PLL 204 may have a time constant of approximately 4 ms, and the clock signal 2xCLK output from the PLL 204 is double the frequency of CLK, and thus has a frequency of approximately 200 MHz. As discussed below, doubling the frequency of clock signal CLK may be helpful when recovering a clock signal within the network interface modules $NIM_0$, $NIM_1$, . . . , $NIM_n$ (FIG. 1). Furthermore, the frame sync signal FS and master frame reset signal MFR are resampled by resampling blocks 206 and 208, respectively, to align the FS and MFR signals with the smoothed and doubled clock signal 2xCLK from block 204. This smoothing and resampling may be effective to reduce or eliminate noise and/or jitter within the timing signals provided by the master system clock generator 130.

Although the periods of frame-sync signal FS and master frame reset signal MFR are not significantly changed by the smoothing and resampling block 202, the periods of FS and MFR are effectively doubled relative to the period of the doubled clock signal 2xCLK. For example, if the signal FS was originally provided to the smoothing and resampling block 202 as occurring every $2^{15}$ periods of the clock signal CLK, as a result of the clock frequency multiplication, the signal FS as output from the smoothing and resampling block will occur every $2^{16}$ periods of the doubled clock signal 2xCLK.

Smoothing and resampling block 202 outputs the doubled clock signal 2xCLK, the resampled frame-sync signal FS, and the resampled master frame reset signal MFR to a timing common block 210, which includes a clock driver 212 and a clock/frame counter 214. The clock driver 212 receives the doubled clock signal 2xCLK, buffers it, and provides the buffered 2xCLK to the clock/frame counter 214, to a timing adjust block 220, and to a delay measure block 250.

The clock/frame counter 214 maintains a count of the periods of 2xCLK that occur between consecutive frame-sync signals FS, and maintains a separate count of frame sync signals FS received from the smooth and resample block 202. The clock/frame counter 214 also provides the count of received frame sync signals FS to the timing adjust block 220, and passes both the frame sync signal FS and the master frame reset signal MFR to a comparator 230 within a coarse timing adjust function 228. Each pulse of the master frame reset signal MFR resets each of the counters within the clock/frame counter 214.

The timing adjust block 220 includes a fine timing adjust unit 222 having a control register 226, and a coarse timing adjust unit 228 having a control register 232. Software controller 125 (FIG. 1) sets the values of the control registers 226 and 232 to effectuate the specific delay needed to synchronize the particular network interface module NIM with the other network interface modules within the synchronized system 101. In an embodiment, the value present in the control register 232 may indicate the number of clock half-periods (i.e., the number of periods of the doubled clock signal 2xCLK) by which to advance or delay the next frame-sync signal FS; the value present in the control register 226 may indicate the number of nanoseconds by which to delay the doubled clock signal 2xCLK.

For example, suppose that the timing signals provided to network interface module NIM, as indicated for module $NIM_0$ in Table 2 above, must be delayed by a total of 1211.80 ns in order to synchronize $NIM_0$ with the other network interface modules within the synchronized system 101 (FIG. 1). Further suppose that the frequency of the doubled clock signal 2xCLK is 200 MHz, so that the duration of a doubled clock period is 5 ns. The total required delay of 1211.80 ns is equal to 242 full periods of the doubled clock signal 2xCLK plus an additional 1.80 ns. In this embodiment under those circumstances, the software controller 125 would set the value of control register 232 to 242; the software controller would also set the value of control register 226 to 1.80. As a result, the fine timing adjust unit 222 will delay the outgoing doubled clock signal 2xCLK by 1.80 ns. Additionally, the coarse timing adjust unit will delay the outgoing frame-sync signal FS and the master frame reset signal MFR by 242 periods of the doubled clock signal 2xCLK.

The fine timing adjust unit 222 receives the doubled clock signal 2xCLK from the clock driver 212 and, using a digital delay line 224, delays the doubled clock signal 2xCLK according to the value present in the control register 226 before passing the outgoing delayed doubled clock signal $2xCLK_{out}$ to an encoding block 240 and to the delay measure block 250.

The coarse timing adjust block 228 receives the frame-sync signal FS and the master frame reset signal MFR from the clock/frame counter 214. The coarse timing adjust block 228 advances or delays the signals FS and MFR by a number of clock periods of the doubled clock signal 2xCLK, according to the value of the control register 232 as described above, before passing the advanced or delayed outgoing signals $FS_{out}$ and $MFR_{out}$ to the encoding block 240, and passing the signal $FS_{out}$ to the delay measure block 250. The operations of the delay measure block 250 will be discussed in detail below.

The encoding block 240 includes a frame marker 242 and an encoder 244. In an embodiment, the encoder 244 is a Manchester encoder, but any self-clocking encoding scheme may be utilized. The frame marker 242 receives the outgoing frame-sync signal $FS_{out}$ and the outgoing master frame reset signal $MFR_{out}$ from the coarse timing adjust block 228. As described below with respect to FIG. 4A, the frame marker 242 provides a serialized bit line ('Serial') to the encoder 244, which also receives the outgoing doubled clock signal 2xCLK from the fine timing adjust block 222 within timing adjust block 220. The encoding block 240 combines and encodes $FS_{out}$, $MFR_{out}$ and 2xCLK into the single outgoing signal $TIME_{out}$ as described below. The encoding block 240 provides the combined timing signal $TIME_{out}$ on the output of the timing controller 135.

Figure 4A:
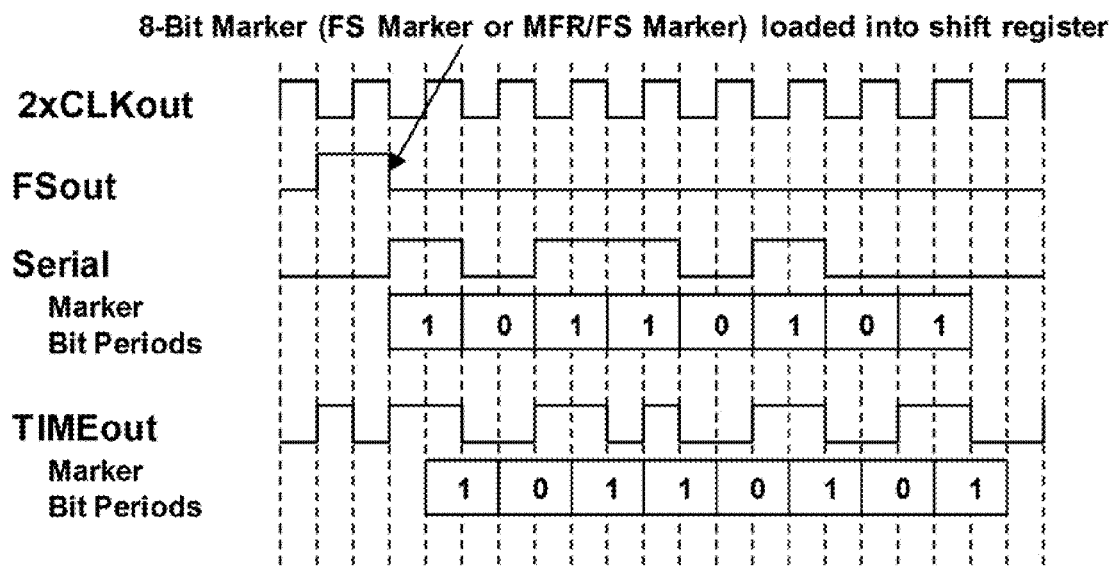
FIG. 4A is a diagram of an embodiment of the data bit streams encoded during operation of the timing controller embodiment depicted in FIG. 2.

FIG. 4A is a diagram of the data bit streams encoded by the encoding block 240 as depicted in FIG. 2. As described above, in an embodiment the outgoing doubled clock signal $2xCLK_{out}$ may be a simple square wave with a constant frequency. In the embodiment depicted, outgoing frame-sync signal FSout provides a square pulse every $2^N$ clock periods. The width of a single FSout pulse is the width of one period of the doubled clock signal 2xCLK. In the embodiment, the outgoing master frame reset signal $MFR_{out}$ (not shown) provides a pulse every $2^M$ clock periods; the pulse width of $MFR_{out}$ is the width of a single frame (i.e., $2^N$ clock periods wide).

Upon the occurrence of an $FS_{out}$ pulse indicating the start of a frame, the frame marker 242 (FIG. 2) serializes one of two markers onto the Serial bit line depending on the state of the $MFR_{out}$ line. These markers are binary bit codes that may be chosen to distinguish between a frame-sync pulse indicating a normal frame sync and one indicating both a frame sync and a master frame reset. Both the value and length of these markers are arbitrary and programmable. As there are only three states to represent (standard clock, FS, or FS/MFR), even a 2-bit marker may be utilized. For example, if a two-bit marker is employed, a standard clock cycle may be indicated by '00', a FS marker may be assigned as '10', and a FS/MFR marker may be assigned as '11'.

In the embodiment depicted by FIG. 4A, an 8-bit marker is used in order to provide higher error tolerance, described in further detail below with respect to the decoding procedure and FIG. 4B. In the embodiment of FIG. 4A, a binary value of '10110101' is used as the eight-bit FS marker. Also in that embodiment, a binary value of '01001011' (not shown) might be utilized as an eight-bit FS/MFR marker. If $MFR_{out}$ is low, then upon detection of the falling edge of an $FS_{out}$ pulse, the frame marker 242 (FIG. 2) will provide the FS marker on the Serial bit line to the encoder 244. If $MFR_{out}$ is high when the falling edge of an $FS_{out}$ pulse is detected by the frame marker 242, the FS/MFR marker will be similarly provided.

The Serial bit line is provided to the encoder 244 (FIG. 2), which, as described above, may be a Manchester encoder. The encoder 244 encodes the marker codes from the Serial bit line using the outgoing doubled clock signal 2xCLK as a carrier. The resulting bit stream is the combined timing signal $TIME_{out}$ provided on the output of timing controller 135. In this manner, the $TIME_{out}$ line provides a single combined and encoded signal from which all three timing signals $2xCLK_{out}$, $FS_{out}$ and $MFR_{out}$ may be recovered by the network interface module NIM, as described below with respect to FIG. 3.

Figure 3:
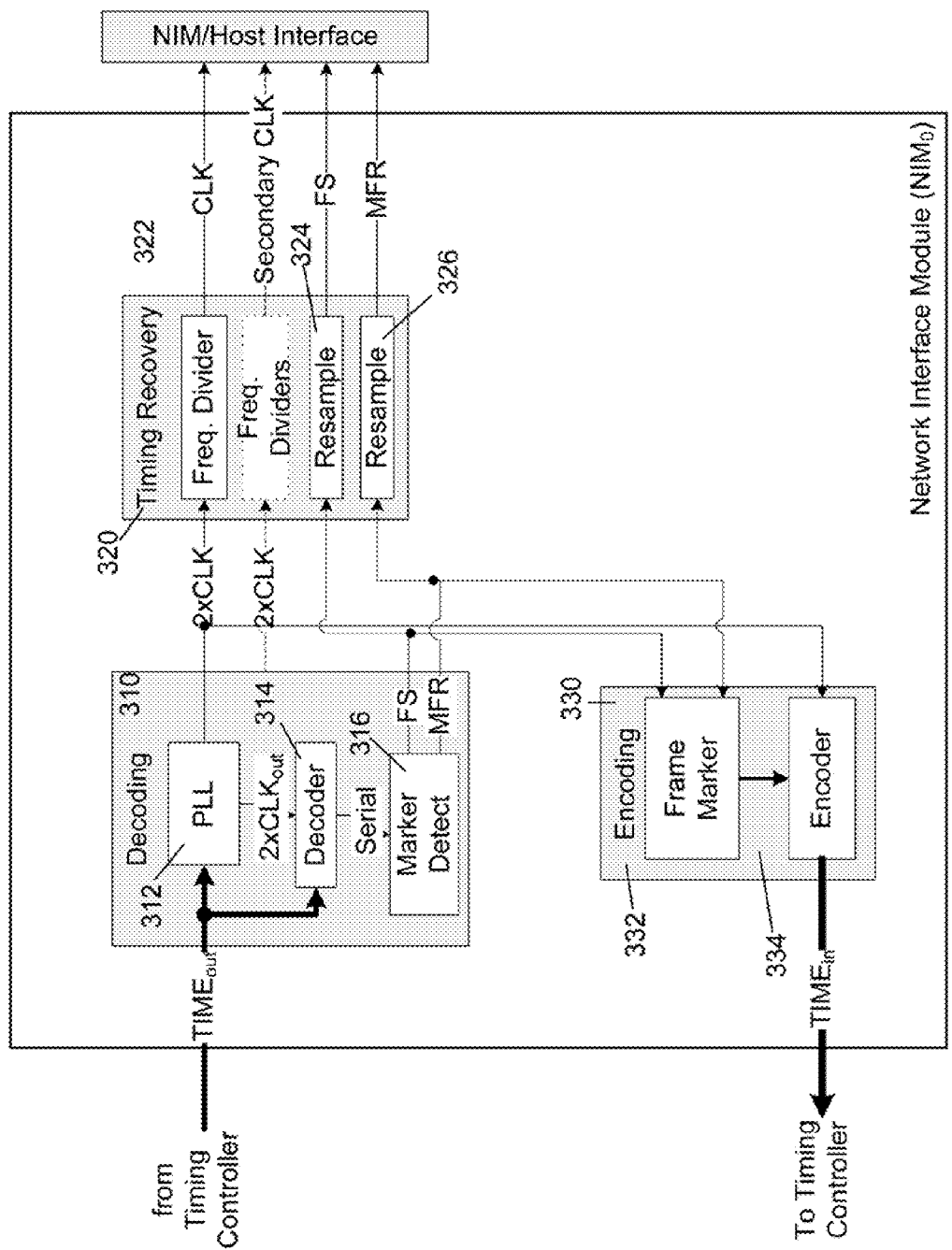
FIG. 3 is a diagram of an embodiment of one of the network interface modules of FIG. 1 configured for closed-loop operation.

FIG. 3 is a diagram of an embodiment of a network interface module NIM configured for closed-loop operation and coupled to the timing controller 135 as depicted in FIG. 2. The network interface module NIM includes a decoding block 310, a timing recovery block 320, and an encoding block 330.

The decoding block 310 includes a PLL 312, demodulator/decoder 314, and a marker detect block 316. The PLL 312 and demodulator/decoder 314 receive the combined timing signal $TIME_{out}$ from the timing controller 135 (FIGS. 1-2). As discussed above, the combined timing signal $TIME_{out}$ is a combined timing signal wherein the doubled clock signal 2xCLK is used as a carrier to modulate the binary markers indicating the frame-sync signal $FS_{out}$ and the master frame reset signal $MFR_{out}$ from the timing controller 135. The PLL 312 smooths the doubled clock signal $2xCLK_{out}$ as recovered from the received combined timing signal $TIME_{out}$, and provides $2xCLK_{out}$ to decoder 314, marker detect block 316, and timing recovery block 320. As described below with respect to FIG. 4B, the decoder 314 receives the combined timing signal $TIME_{out}$ from timing controller 135 and the smoothed doubled clock signal $2xCLK_{out}$ from the PLL 312, and provides a serialized bit line ('Serial') to the marker detect block 316, which also receives the doubled clock signal $2xCLK_{out}$ from the PLL 312.

Figure 4B:
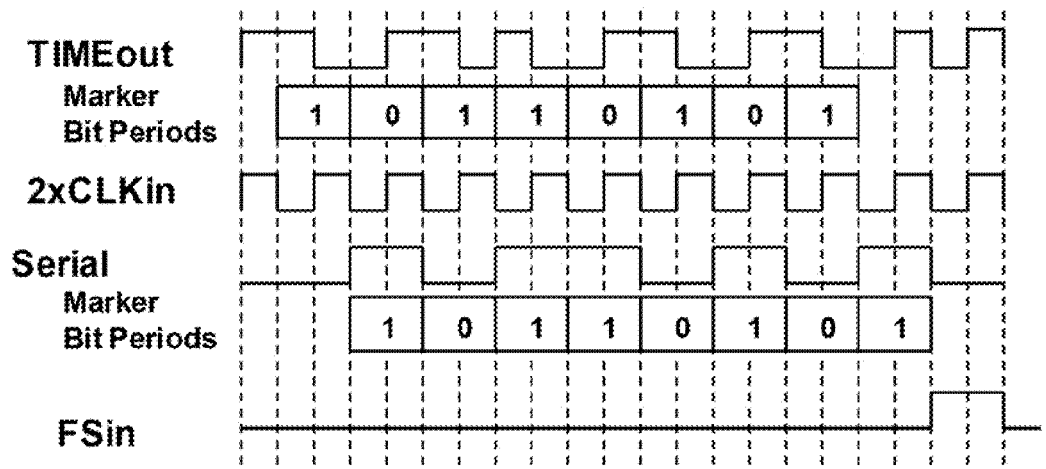
FIG. 4B is a diagram of an embodiment of the data bit streams decoded during operation of the timing controller embodiment depicted in FIG. 2.

FIG. 4B is a diagram of the data bit streams decoded by the decoding block 310 within the network interface module NIM of FIG. 3. At the top of FIG. 4B is the combined timing signal $TIME_{out}$ received from timing controller 135 (FIGS. 2-3). $2xCLK_{out}$ is the doubled clock signal recovered by the PLL 312 and passed to the decoder 314. The demodulator/decoder 314 decodes $TIME_{out}$ to provide the 'Serial' bit line to marker detect block 316. The marker detect block 316 receives the 'Serial' bit line and, in response to detecting either the binary FS marker indicating the frame sync signal $FS_{out}$ or the combined binary FS/MFR marker indicating both the frame-sync signal $FS_{out}$ and the master frame reset signal $MFR_{out}$, generates the recovered signals FS and MFR (FIG. 3). In an embodiment, the 'Serial' bit line is shifted into an 8-bit shift register within the marker detect block 316 and compared upon the receipt of each bit with the two known binary marker patterns. The number of matching bits is summed for each of the two marker patterns (with the maximum number of matching bits being eight for an 8-bit marker pattern). If the sum equals or exceeds a programmable minimum coincidence threshold for a given marker pattern, then the marker is found to have been detected and the rising edge of the corresponding timing signal FS or both of the signals FS and/or MFR are generated. This allows for some bits in a received marker to be in error, as may be caused by various environmental effects. In another embodiment, triple-modular-redundancy may be used, wherein three instances of the marker detect blocked 316 are implemented. In an embodiment utilizing TMR, a "voter" system is implemented to accept a result passed from two of the three instances if there is disagreement between the three, to detect and correct for any errors present. Of course, any other error correction technique may also be used. Just as when they were encoded by encoding block 240 (FIG. 2), in the embodiment depicted by FIG. 3 a pulse of frame-sync signal FS is the width of one period of doubled clock signal 2xCLK, whereas a pulse of master frame reset signal MFR is the width of an entire frame.

Returning to FIG. 3, the timing recovery block 320 includes a frequency divider 322, a resampling block 324, and a resampling block 326. The frequency divider 322 receives the doubled clock signal 2xCLK from PLL 312, and halves the frequency to recover the original clock signal CLK. Because this operation may result in one of two clock phases, the timing recovery block 320 re-synchronizes the clock signal CLK with the frame sync pulse FS to determine the correct clock phase. For example, by matching the rising edge of the CLK signal with the rising edge of the FS pulse, the correct phase for the recovered clock signal CLK may be determined. The correctly-phased clock signal CLK is then passed to the NIM/Host Interface. The resampling block 324 and resampling block 326 receive, respectively, the frame sync signal FS and the master frame reset signal MFR from the marker detect block 316. These signals are resampled to align them with the recovered clock signal CLK produced by frequency divider 322 and to reduce or remove any remaining noise or jitter and passed to the NIM/Host Interface.

In another embodiment, the timing recovery block 320 may include one or more additional frequency dividers or frequency multipliers. For example, if in an embodiment wherein the clock signal CLK has a frequency of 100 MHz, but a particular host device HOST requires or would benefit from an additional 12.5 MHz clock signal, the timing recovery block 320 may include a divide-by-16 frequency divider to recover a 12.5 MHz clock signal from the doubled clock signal 2xCLK. In the embodiment depicted by FIG. 3, one optional additional frequency divider is shown with a dotted border in timing recovery block 320. This additional frequency divider provides the Secondary CLK signal to the NIM/Host Interface. As before, this clock signal would be re-synchronized with frame sync signal FS in order to determine the correct phase. Additional frequency dividers or frequency multipliers may be included in any desired combination to provide clock signals that are synchronized with 2xCLK and that have arbitrary frequencies.

The encoding block 330 includes a frame marker 332 and an encoder 334, and operates substantially the same as the encoding block 240 within timing controller 135. The encoding block 330 receives the doubled clock signal 2xCLK, the frame-sync signal $FS_{out}$, and the master frame reset signal $MFR_{out}$ from decoding block 310, and provides a combined timing signal $TIME_{in}$ on the output of the network interface module NIM.

Referring again to FIG. 2, the combined timing signal $TIME_{in}$ is received from the interface module NIM by a decoding block 280, which includes a PLL 282, a decoder 284, and a marker detect block 286. The decoding block 280 operates substantially the same as the decoding block 310 as discussed above with respect to FIG. 3. The recovered doubled clock signal $2xCLK_{in}$ and the recovered frame-sync signal $FS_{in}$ are passed to the delay measure block 250.

The delay measure block 250 includes a fine delay measurement unit 252 and a coarse delay measurement unit 260. The fine delay measurement unit 252 includes an enable control 254, a ring counter sensor (RCS) 256, and control/result registers 258. The coarse delay measurement unit 260 includes an enable control 262, a counter 264, and control/result registers 266.

In operation, the fine delay measurement unit 252 performs two functions. First, it is used to calibrate the digital delay line 224 by comparing the doubled clock signal 2xCLK from the clock driver 212 with the outgoing doubled clock signal $2xCLK_{out}$ from the digital delay line 224. If the measured delay between these signals differs from the intended programmed delay, that difference is passed to the software controller 125 (FIG. 1) using the control/result registers 258. In an embodiment, the software controller 125 may compensate for this measured calibration delay when setting the values for the control registers 226 and 232 as discussed above. Second, the fine delay measurement unit 252 measures the delay between the outgoing doubled clock signal $2xCLK_{out}$ from the digital delay line 224 and the returned doubled clock signal $2xCLK_{in}$ from the decoding block 280. The RCS 256 is discussed below in further detail in conjunction with FIG. 5.

The coarse delay measurement unit 260 measures the delay time between the outgoing frame-sync signal $FS_{out}$ from the timing adjust block 220 and the returned frame-sync signal $FS_{in}$ from the decoding block 280. The enable control 262 receives the outgoing doubled clock signal $2xCLK_{out}$ from the digital delay line 224, the outgoing frame-sync signal $FS_{out}$ from the timing adjust block 220, and the returned frame-sync signal $FS_{in}$ from the decoding block 280. The enable control 262 passes the doubled clock signal 2xCLK to counter 264. When performing a delay measurement, the enable control 262 starts the operation of counter 264 when the outgoing frame-sync signal $FS_{out}$ is received, increments the counter at each cycle of $2xCLK_{out}$ and stops the operation of the counter when the returned frame-sync signal $FS_{in}$ is subsequently received. In this way, the counter 264 determines the number of cycles of doubled clock signal $2xCLK_{out}$ by which the frame sync signal FS was delayed in its path from the timing adjust block 220 to the network interface module NIM and back to the delay measure block 250. This coarse delay measurement is passed to the software controller 125 (FIG. 1) via the control/result registers 266.

Figure 5:
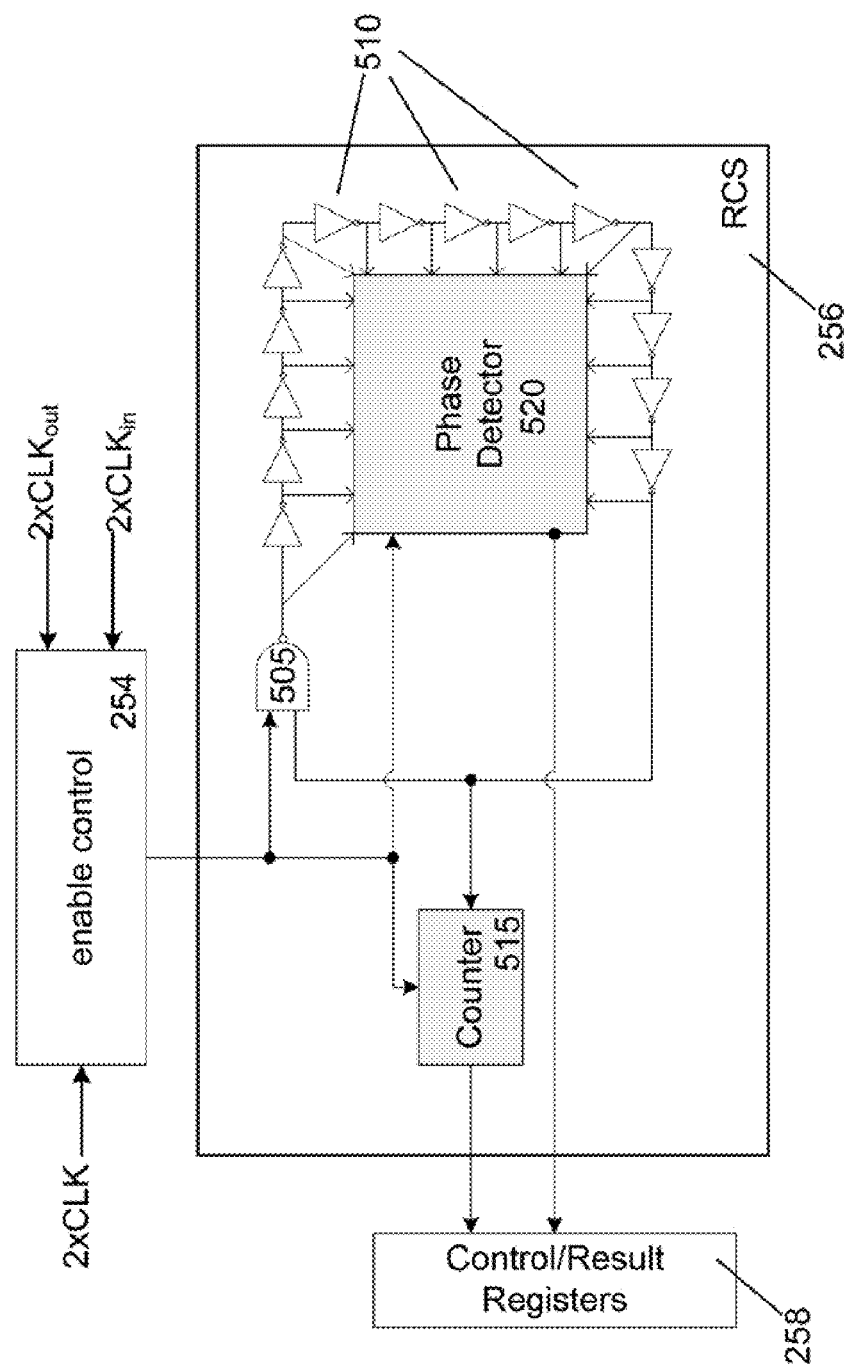
FIG. 5 is a schematic diagram of an embodiment of the fine delay measurement unit of FIG. 2.

FIG. 5 is a schematic diagram of an embodiment of the fine delay measurement unit 252 within the delay measure block 250 of FIG. 2. The ring counter sensor (RCS) 256 comprises a NAND gate 505, a plurality of circularly-connected inverters 510, a cycle counter 515, and a phase detector 520. In total, an odd number of inverting gates are circularly connected such that the ring counter sensor (RCS) 256 will oscillate when enabled. The NAND gate 505 is connected to an enable line coupled to an enable control 254. In another embodiment, the ring counter sensor (RCS) 256 may be implemented with NAND gates in place of the inverters 510 or by any other delay elements known in the art.

The enable control 254 receives as input the 2xCLK signal from the timing common block 210, the $2xCLK_{out}$ signal from the timing adjust block 220, and the $2xCLK_{in}$ signal from the decoding block 280. During a calibration cycle, as discussed above, the enable control 254 compares the incoming signals 2xCLK and $2xCLK_{out}$. For example, the enable control 254 may place the enable line in a high-logic state when detecting a rising edge on 2xCLK and then place the enable line in a low-logic state when detecting the next rising edge on $2xCLK_{out}$. During a delay measurement cycle, also discussed above, the enable control 254 compares the incoming signals $2xCLK_{out}$ and $2xCLK_{in}$. The enable control 254 may place the enable line in a high-logic state when it detects a rising edge on $2xCLK_{out}$ and place the enable line in the low-logic state when detecting the next rising edge on $2xCLK_{in}$.

When the enable line transitions from a logic-low state to a logic-high state, a leading pulse edge is propagated through each of the inverters in the RCS 256. The counter 515 is reset when the enable line transitions from the logic-low state to the logic-high state, and increments a count when the signal from the final inverter 510 to the NAND gate 505 changes state. In this manner, the counter 515 maintains a count of the number of complete cycles that the leading pulse edge has completed since the enable line transitions to the logic-high state. When the enable line subsequently transitions from a logic-high state to a logic-low state, the counter 515 places the value of this count in the control/result registers 258.

When the enable line transitions from a logic-high state to a logic-low state, the phase detector 520 determines the position of the leading pulse edge within the RCS. In an embodiment, the phase detector 520 determines the position of the leading pulse edge by noting which of the plurality of inverters 510 has the same value as the inverter immediately preceding it. The count from the cycle counter 515 and the detected position of the leading pulse edge are stored in the control/result registers 258. In this way, a very precise measurement may be made of the time period elapsed between transitions of the RCS enable line, accurate to a threshold approximately equivalent to the individual propagation delay of each inverter within the RCS 256.

In the embodiment depicted by FIG. 5, suppose that the NAND gate 505 and each of the plurality of inverters 510 have an individual propagation delay of 30 ps. If the doubled clock signal 2xCLK has a frequency of 200 MHz, the clock period of the doubled clock signal is approximately 5 ns, approximately equivalent to 166 inverter propagation delays. In this example, the RCS 246 can provide a delay measurement with an accuracy tolerance of approximately ±15 ps (based on the individual propagation delay of each of the inverters 510 and the NAND gate 505). Of course, the number and type of inverters may be selected such that the ring counter sensor may meet whatever accuracy threshold is called for.

In operation, the software controller 125 (FIG. 1) is operable to access the control/result registers 258 within the fine delay measurement unit 252 and the control/result registers 266 within the coarse delay measurement unit 260, and to both read and write the control registers 226 and control registers 232, within the fine timing adjust block 222 and the coarse timing adjust block 228, respectively. The total delay measurement for signal propagation from the timing controller 135, to the network interface module NIM, and back again, may be determined from the control/result registers 258 and 266. As discussed above with respect to Tables 1 and 2, any advance or delay needed in propagating the timing signals to the network interface module NIM may be programmed by the software controller 125 by setting the values of control registers 226 and 232.

In order to more fully protect the timing synchronization system, certain portions of the logical blocks, modules, and circuits described herein may be implemented as voltage islands on an integrated circuit (IC) die, in which the particular logical block, module or circuit is partitioned from the other logical blocks, modules or circuits in the system, and provided with a separate supply voltage. For example, within the embodiment depicted in FIG. 2, the timing common block 210 and the delay measure block 240 may each be partitioned as a separate voltage island. In another embodiment, the timing adjust block 220 may be separately partitioned in its own voltage island. Moreover any of the logical blocks, modules, and circuits described herein may be implemented using triple modular redundancy (TMR), wherein three instances of the particular block, module, or circuit are implemented. In an embodiment utilizing TMR, a "voting" system is implemented to accept a result passed from two of the three instances if there is disagreement between the three. Such protection measures may significantly reduce the effects of noise and interference between the respective logical blocks, modules, and circuits.

Figure 6:
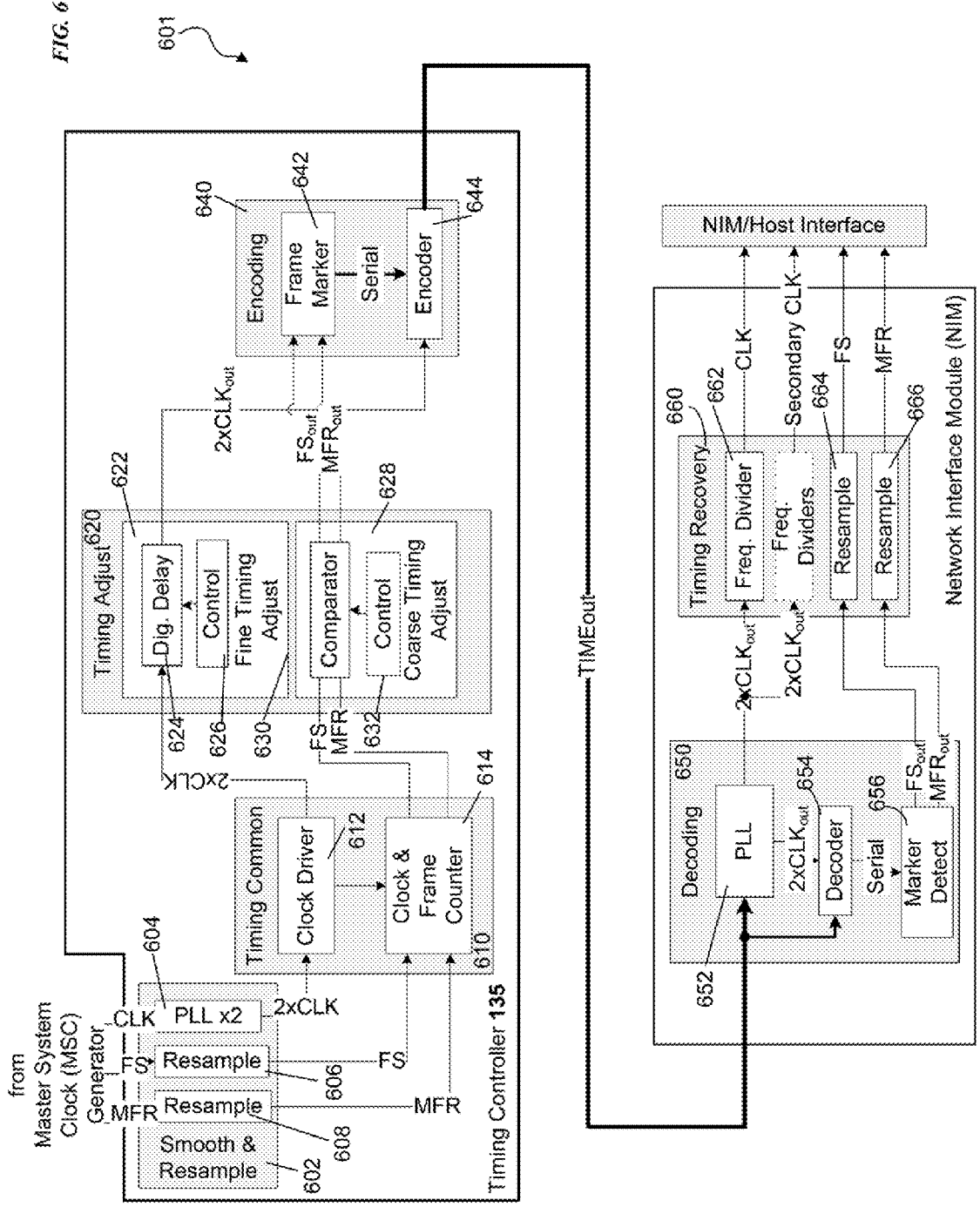
FIG. 6 is a diagram of an embodiment of the timing controller and a network interface module of FIG. 1 configured for open-loop operation.

FIG. 6 is a schematic diagram of an embodiment of a timing synchronization system 601 being operated in an open-loop configuration. The components and operations of the timing synchronization system 601 are substantially similar to the closed-loop configuration depicted in FIGS. 2-3. However, there is no return timing signal path from the network interface module NIM to the timing controller 135. Consequently, the network interface module NIM does not utilize an encoding block, and the timing controller 135 utilizes neither a decoding block for recovering a set of return timing signals, nor a delay measure block for measuring the delay time of those timing signals' return. In this embodiment, the timing adjustments controlled by software controller 125 and implemented by fine timing adjust unit 622 and coarse timing adjust unit 628 are responsive to the calibration and telemetry data retained in storage module 120 (FIG. 1) but not to any dynamic delay measurement. As before, however, any specific delay needed for a particular network interface module NIM is controlled by the values of control registers 626 and 632 as set by the software controller 125. In open-loop operations, however, these values would not be expected to change other than in response to aging and environmental effects predicted prior to installation of the system. For example, if pre-installation lab measurements or simulation models predict that the propagation delay to a network interface module NIM will increase over time at a rate of 13 ns per month, the software controller 125 may compensate for that expected change by altering the values set for control registers 626 and 632.

In open-loop operations, the timing controller 135 processes the timing signals CLK, FS, and MFR substantially the same as in closed-loop operations, with the following exceptions. In an embodiment, the timing common block 610 and its clock driver 612 re-drive the doubled clock signal 2xCLK but provide that doubled clock signal only to the digital delay line 624 within the timing adjust block 620—it is not provided to any delay measure block. Similarly, the outgoing timing signals $2xCLK_{out}$, $FS_{out}$ and $MFR_{out}$ output from the timing adjust block 620 are not provided to any delay measure block, being provided exclusively to an encoding block 640. The operations of encoding block 640 are substantially similar to those of the encoding block 240 of FIG. 2.

The open-loop operations of the network interface module NIM are substantially similar to operations in the closed-loop configuration as detailed above, with the following exception. The decoding block 650 processes the combined timing signal $TIME_{out}$ in a manner substantially similar to that described for the decoding block 310 with respect to FIG. 3, but provides the separated timing signals $2xCLK_{out}$, $FS_{out}$ and $MFR_{out}$ only to a timing recovery block 660, rather than additionally providing those signals to an encoding block for return transmission to the timing controller 135.

Figure 7:
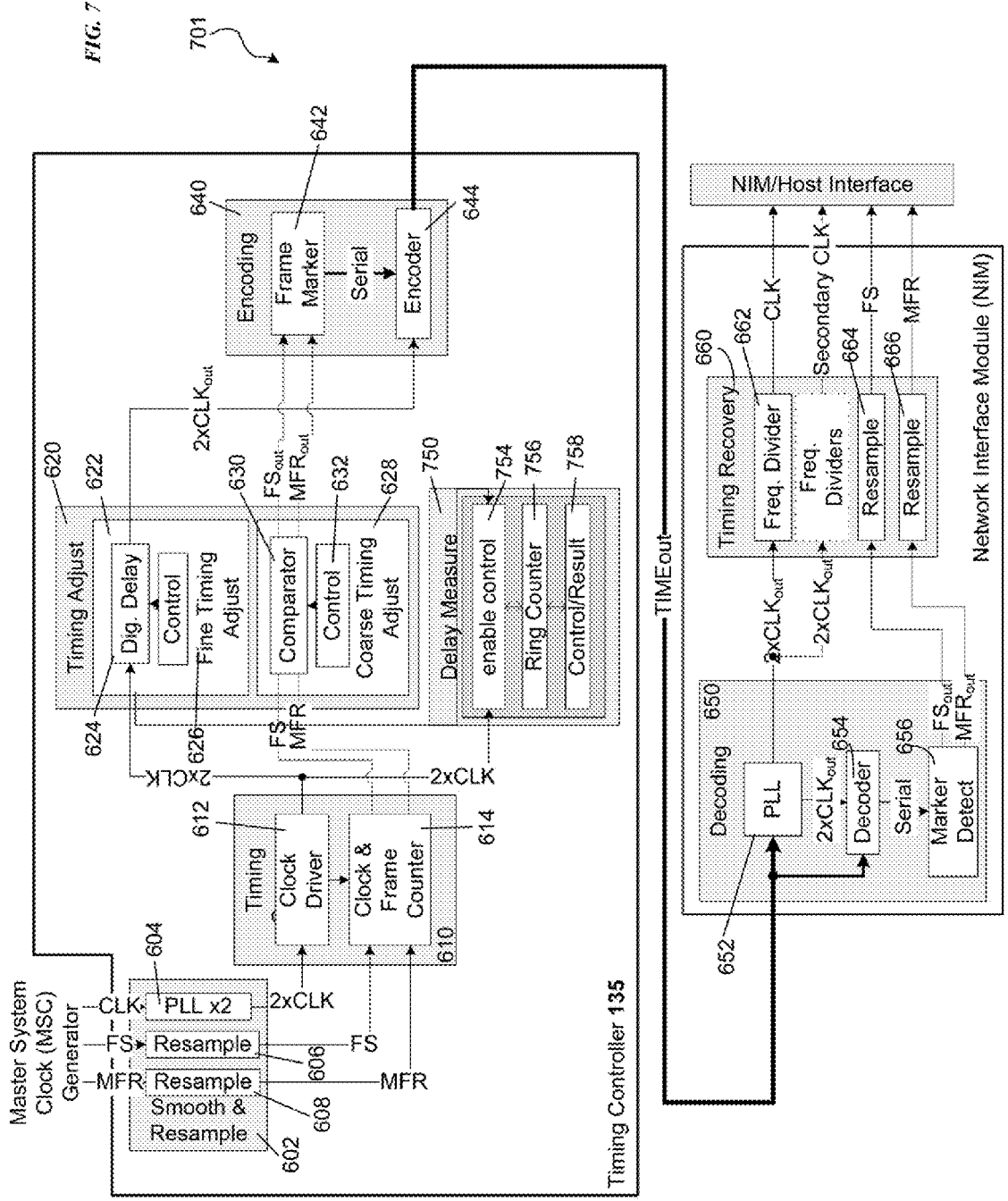
FIG. 7 is a diagram of another embodiment of the timing controller and a network interface module of FIG. 1 configured for open-loop operation.

FIG. 7 is a schematic diagram of another embodiment of a timing synchronization system 701 being operated in an open-loop configuration. The operations of the timing synchronization system 701 are substantially similar to those of the timing synchronization system 601 depicted in FIG. 6. In this embodiment, however, some delay measurement capability is retained for calibration purposes within the timing controller 135, and therefore the synchronization system 701 includes a delay measure block 750. The timing common block 610 and its clock driver 612 re-drive the doubled clock signal 2xCLK and provide that doubled clock signal to the digital delay line 624 within the timing adjust block 620 and to the delay measure block 750. The delay measure block 750 includes an enable control 754, a ring counter sensor 756, and control/result registers 758. The outgoing timing signal $2xCLK_{out}$ output from the timing adjust block 620 are provided to both an encoding block 640 and the delay measure block 750.

In one embodiment, delay measurement block 750 may be used to calibrate the digital delay line 624 in the manner discussed above with respect to the fine delay measurement block 252 in the closed-loop configuration of FIG. 2: the doubled clock signal 2xCLK from the clock driver 612 is compared to the outgoing doubled clock signal $2xCLK_{out}$ from the digital delay line 624. If the measured delay between these signals differs from the intended programmed delay corresponding to the value stored by the software controller 125 (FIG. 1) in the control registers 626 and 632, that difference is passed to the software controller 125 (FIG. 1) using the control/result registers 758. The software controller 125 may compensate for this measured calibration delay when setting the values for the control registers 626 and 632.

While the above detailed description has shown, described, and pointed out novel features of the disclosed subject matter as applied to various embodiments, it will be understood that various omissions, substitutions, and changes in the form and details of the device or process illustrated may be made by those skilled in the art without departing from the spirit of the disclosed subject matter. For example, in an embodiment the timing signals generated by the MSC generator may be provided in both primary and redundant signal streams, such that either stream may be selected by the initial smoothing and resampling function.

What is claimed is:

1. A timing circuit, comprising:
a measure circuit operable to measure a first time difference in a first incoming timing signal relative to a first outgoing timing signal;
a delay circuit operable to impart a second time difference to the first outgoing timing signal; and
a control circuit operable to adjust the second time difference in response to the first time difference, wherein
the measure circuit is further operable to measure a third time difference in a second incoming timing signal relative to a second outgoing timing signal;
the delay circuit is further operable to impart a fourth time difference to the second outgoing timing signal; and
the control circuit is further operable to adjust the fourth time difference in response to the third time difference.

2. The timing circuit of claim 1, wherein:
the first outgoing timing signal is provided to a first host component;

the second outgoing timing signal is provided to a second host component; and the control circuit is operable to adjust the second time difference and the fourth time difference such that the first and second outgoing timing signals respectively reach the first and second host components at substantially the same time.

3. The timing circuit of claim 1, further comprising a second outgoing timing signal that is modulated by the first outgoing timing signal.

4. The timing circuit of claim 3, wherein the second outgoing timing signal comprises a binary code.

5. The timing circuit of claim 4, wherein the binary code is, further encoded using a Manchester encoding scheme.

6. The timing circuit of claim 1, wherein the measure circuit is implemented on a first integrated circuit, the delay circuit is implemented on a second integrated circuit, and the control circuit is implemented on a third integrated circuit.

7. The timing circuit of claim 6, wherein the first integrated circuit and the second integrated circuit are the same.

8. The timing circuit of claim 6, wherein the first integrated circuit in the third integrated circuit are the same.

9. A timing circuit, comprising:
a receiving circuit operable to receive a combined timing signal that represents a first timing signal and second timing signal;
a first detection circuit coupled to the receiving circuit and operable to generate a third timing signal responsive to the first timing signal; and
a second detection circuit coupled to the receiving circuit and operable to generate a fourth timing signal responsive to the second timing signal.

10. The timing circuit of claim 9, wherein the first timing signal comprises a clock signal and the second timing signal is modulated by the first timing signal.

11. The timing circuit of claim 10, further comprising a decoding circuit operable to generate a fifth timing signal responsive to the fourth timing signal, and wherein the fourth timing signal is encoded with an encoding scheme.

12. The timing circuit of claim 11, wherein the encoding scheme is a Manchester encoding scheme.

13. A timing synchronization system, comprising:
a first timing circuit, having
a measure circuit operable to measure a first time difference in a first outgoing combined signal relative to a first incoming combined signal, the first outgoing combined signal having a first timing signal and a second timing signal,
a delay circuit operable to impart a second time difference to the first outgoing combined signal, and
a control circuit operable to adjust the second time difference in response to the first time difference; and
a first, host component coupled to the first timing circuit, the first host component having
a receiving circuit operable to receive the first outgoing combined signal,
a first detection circuit coupled to the receiving circuit and operable to generate a third timing signal responsive to the first timing signal, and
a second detection circuit coupled to the receiving circuit and operable to generate a fourth timing signal responsive to the second timing signal.

14. The system of claim 13, wherein the first incoming combined signal comprises the third timing signal and the fourth timing signal.

15. The system of claim 13, wherein:
the measure circuit is further operable to measure a third time difference in a second incoming combined signal relative to a second outgoing combined signal;
the delay circuit is further operable to impart a fourth time difference to the second outgoing combined signal; and
the control circuit is further operable to adjust the fourth time difference in response to the third time difference.

16. The system of claim 15, further comprising a second host component, wherein
the first outgoing combined signal is provided to the first host component;
the second outgoing combined signal is provided to the second host component; and
the control circuit is operable to adjust the second time difference and the fourth time difference such that the first and second outgoing combined signals respectively reach the first and second host components at substantially the same time.

17. The system of claim 13, wherein the first timing circuit is implemented on a first integrated-circuit die, and the first host component is implemented on a second integrated-circuit die.

18. The system of claim 13, wherein the first timing circuit and the first host component are implemented on the same integrated-circuit die.

19. A method for encoding a plurality of timing signals, comprising:
generating a clock signal;
generating a first timing signal;
generating a second timing signal;
modulating the clock signal with a first marker, responsive to the first timing signal;
modulating the clock signal with a second marker, responsive to the second timing signal.

20. The method, of claim 19, further comprising encoding the first and second markers with an encoding scheme.

21. The method of claim 20, wherein the encoding scheme is a Manchester encoding scheme.

22. A method for synchronizing a plurality of components, comprising:
providing a first outgoing timing signal to a first component;
providing a second outgoing timing signal to a second component;
measuring a first time difference in a first incoming timing signal relative to the first outgoing timing signal;
measuring a second time difference in a second incoming timing signal relative to the second outgoing timing signal;
imparting a third time difference to the first outgoing timing signal, responsive to measuring the first time difference; and
imparting a fourth time difference to the second outgoing timing signal, responsive to measuring the second time difference.

23. The method of claim 22, wherein the third and fourth time differences are respectively imparted to the first and second outgoing timing signals such that the first and second outgoing timing signals respectively reach the first and second components at substantially the same time.

* * * * *